Dec. 24, 1963         L. L. KEPKAY              3,115,142
              AUXILIARY RETHRESHER FOR A COMBINE
Filed May 10, 1961                          3 Sheets-Sheet 1
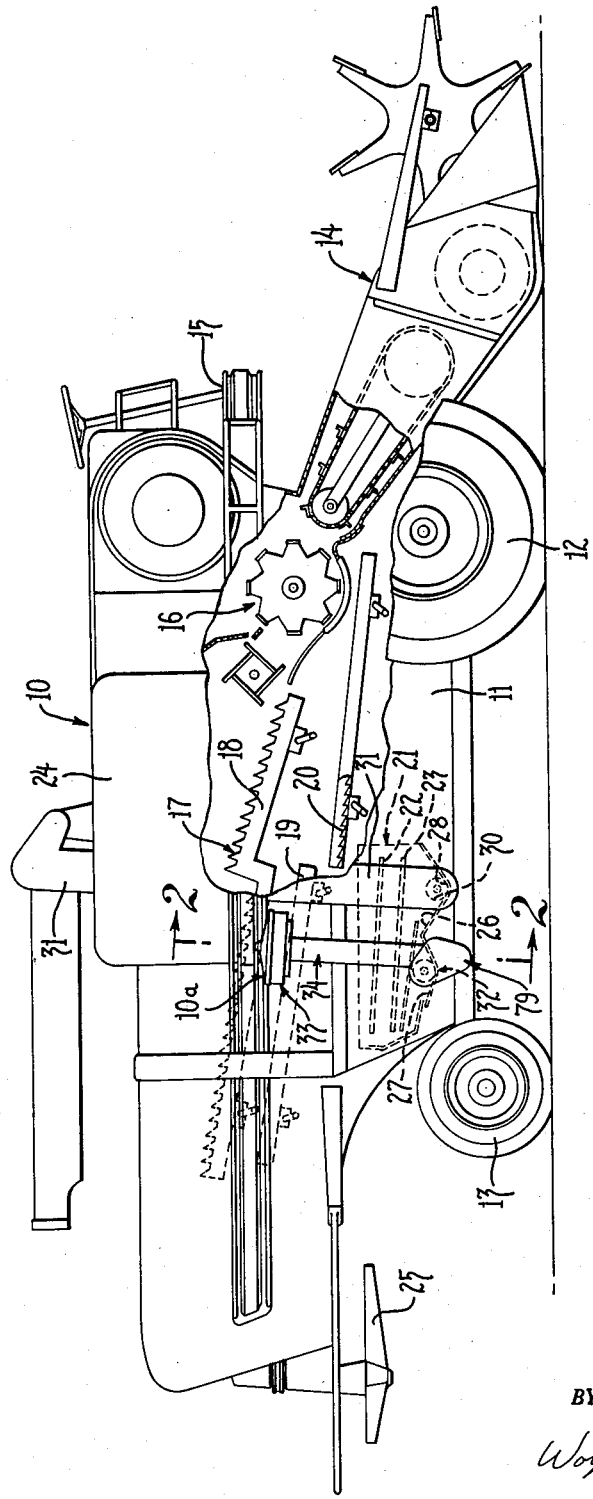
INVENTOR.
LESLIE L. KEPKAY
BY
*Wolfe, Hubbard, Voit & Osann*
ATTORNEYS.

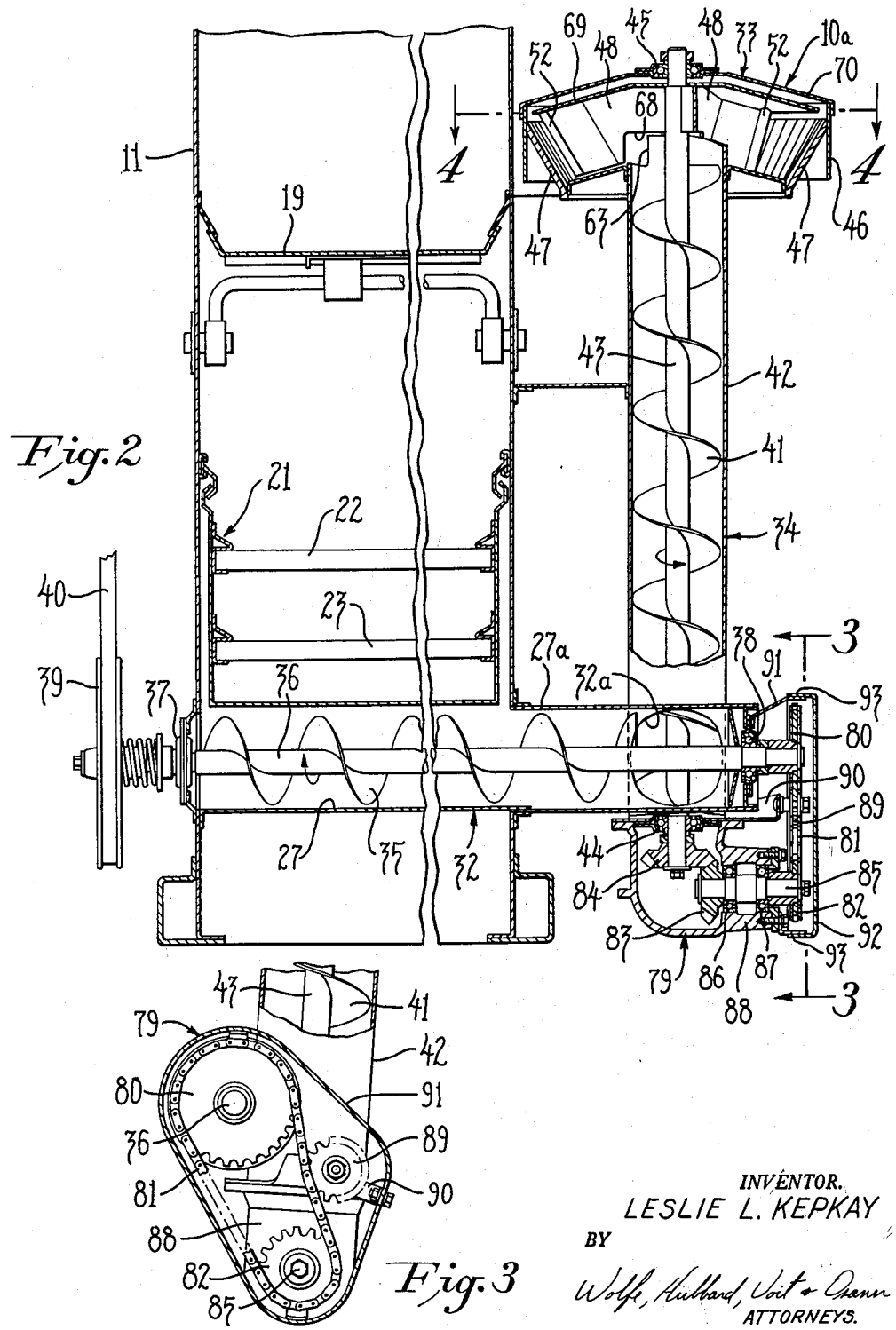

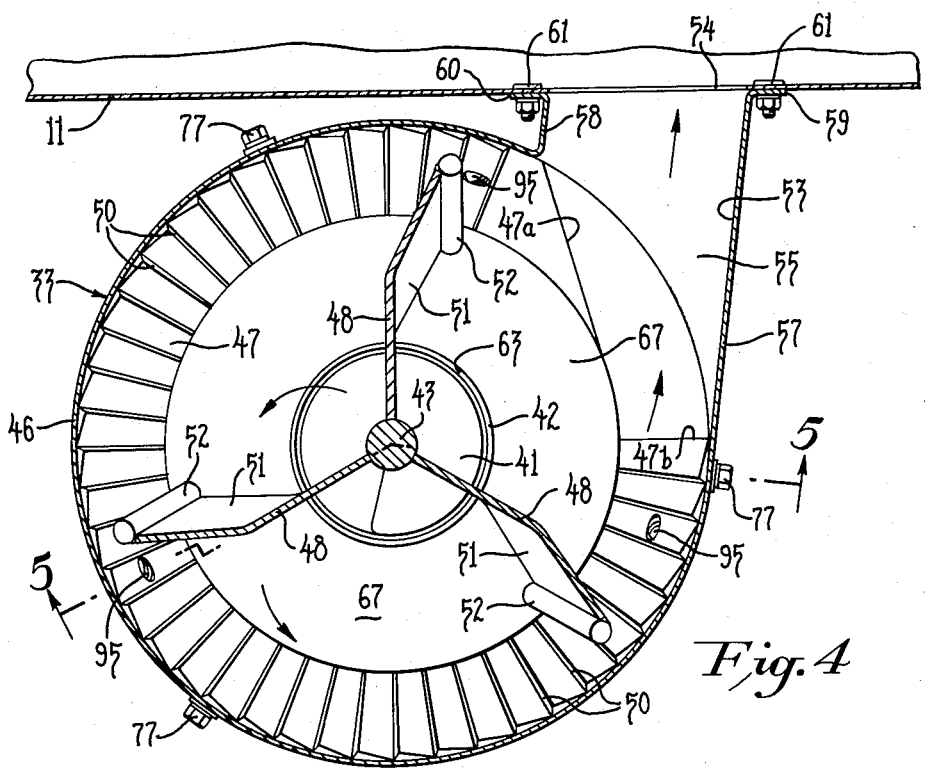
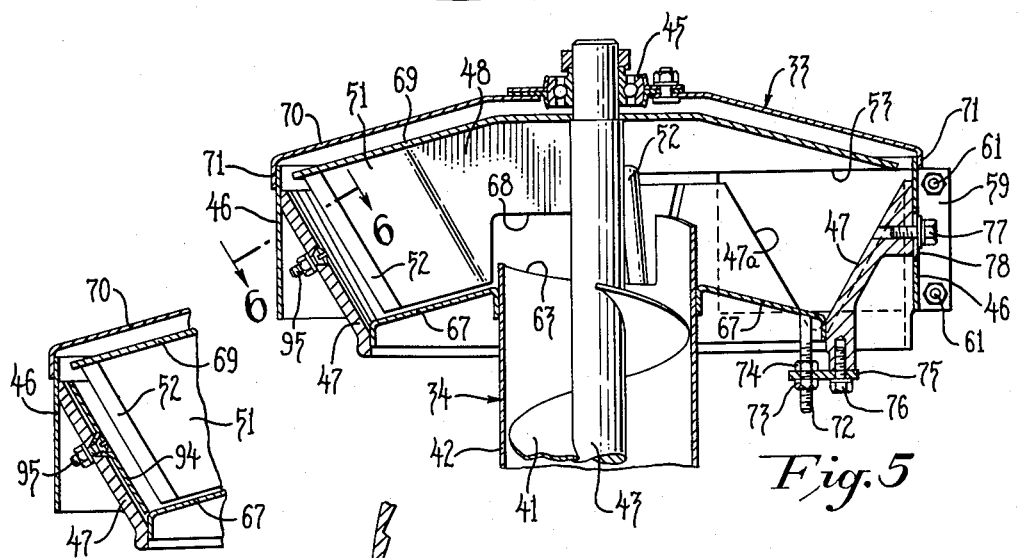
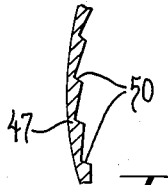
INVENTOR.
LESLIE L. KEPKAY

United States Patent Office 3,115,142
Patented Dec. 24, 1963

3,115,142
AUXILIARY RETHRESHER FOR A COMBINE
Leslie L. Kepkay, Toronto, Ontario, Canada, assignor to Massey-Ferguson Limited, Toronto, Ontario, Canada, a corporation of Canada
Filed May 10, 1961, Ser. No. 109,038
5 Claims. (Cl. 130—27)

This invention relates generally to the separating and cleaning units in a combine and more particularly to a device for collecting the tailings from such units, rethreshing them and returning them for reprocessing to the separating and cleaning units.

During recent years the development and use of large self-propelled combines has greatly increased the rate and ease with which grain crops may be harvested. However, with large combines, that is, those with a cutting width in excess of seven feet, it is particularly important that the threshing, cleaning and separating units be capable of handling the greatly increased flow of material coming into the combine. With a large volume of crop material being handled, even small percentages of grain passed out with the tailings and refuse represents a considerable loss.

One expedient commonly used to minimize grain losses is a tailings return conveyor. Conventionally, such conveyors return the "tailings," or incompletely separated grain, for reprocessing so that the potentially lost grain can be recovered. Handling large volumes of tailings by the use of a returns conveyor imposes additional problems, however. The tailings cannot readily be returned to the main threshing cylinder without clogging the cylinder and thereby reducing the threshing efficiency of the combine. Neither can the tailings be simply dumped, without rethreshing, onto the cleaning and separating units without overloading and rendering inefficient at least portions of these units.

Accordingly, it is an object of the present invention to provide a tailings handling device for a combine which performs a rethreshing action prior to uniformly distributing the tailings to the separating unit of the combine.

More specifically, it is an object to provide a device of the above type in which the grain and tailings are driven through a substantially complete revolution within a rethreshing chamber before projecting into the separating unit, thereby insuring an effective rethreshing action.

It is a further object to provide a device as described above in which the running clearance of the threshing blades may be easily adjusted to accommodate different types of grain and harvesting conditions.

Another object of the present invention is to provide a device of the above type in which the rethreshing chamber may be easily deactivated when threshing conditions do not warrant its use.

Other objects and advantages of the invention will become apparent upon reading the following detailed description and upon reference to the drawings, in which:

FIGURE 1 is a side elevation of a combine, with portions broken away, having a tailings handling device embodying the present invention;

FIG. 2 is an enlarged fragmentary section, taken along the line 2—2 in FIG. 1, showing the tailings handling device of the combine;

FIG. 3 is a section taken along the line 3—3 in FIG. 2;

FIG. 4 is an enlarged fragmentary section taken along the line 4—4 in FIG. 2;

FIG. 5 is a fragmentary section taken along the line 5—5 in FIG. 4;

FIG. 6 is a fragmentary section taken along the line 6—6 in FIG. 5; and

FIG. 7 is a fragmentary section similar to FIG. 5 showing a modification of the present invention.

While the invention will be described in connection with a preferred embodiment, it will be understood that I do not intend to limit the invention to the embodiment. On the contrary, I intend to cover all alternatives, modifications, and equivalents as may be included within the spirit and scope of the invention as defined by the appended claims.

Turning now to the drawings, there is shown a combine 10 having a tailings handling device 10a embodying the invention mounted on a main body or frame 11 that is supported by front driving wheels 12 and rear steering wheels 13. A grain header assembly 14 is carried at the forward end of the combine for harvesting the crop and an operator's platform 15 is disposed at the front of the combine so as to overlook the header assembly.

The combine body 11 encloses a cylinder unit 16 for threshing the grain in the incoming crop material as received from the header assembly 14 and a separating unit 17, which includes straw walkers 18, for separating the larger pieces of refuse material from the grain. The separated grain falls onto grain pans 19, 20 which direct the grain to a shaker shoe assembly 21 having a chaffer sieve 22 and a shoe sieve 23 that receive the grain for final cleaning before it is deposited in a clean grain storage bin 24.

In operation, a fan (not shown) directs a blast of air upwardly through the separating unit 17 which raises the lighter refuse material above the straw walkers 18 and aids the straw walkers in separating the refuse material from the grain. Thereafter, the refuse material is directed back and out of the combine over a straw scatterer 25 rotatably driven at the rear of the combine.

The conglomeration of grain, chaff and smaller bits of refuse material falls through the straw walkers and is collected by the grain pans 19, 20. The grain pans 19, 20 then direct the material to the shoe assembly 21. The chaffer sieve 22 filters the larger bits of refuse material out and the air blast cooperates with the chaffer sieve 22 to move this refuse material through the open back of the combine. The overflow from the chaffer sieve 22 falls onto a channeled bottom 26 of the shaker shoe assembly 21 and drops into a tailings trough 27.

The material that falls through the chaffer sieve 22 is agitated by the shoe sieve 23. The shoe sieve 23 passes clean grain into a clean grain trough 28 formed in the bottom 26 of the shaker shoe assembly. This clean grain is moved by an auger 30 to a clean grain elevator 31 which lifts the harvested material into the grain storage bin 24.

The overflow from the shoe sieve 23 falls to the bottom 26 of the shaker shoe assembly and finds its way into the tailings trough 27.

In accordance with the present invention, the tailings handling device 10a includes a rethreshing unit 33 which receives the tailings from a cross conveyor 32 and a lifting conveyor 34 and which both rethreshes the grain in the tailings and pitches the chaff, tailings and rethreshed grain into and across the breadth of the grain pan 19. In this way, that part of the harvested material which was not effectively threshed in the cylinder 16 is subjected to a rethreshing action, and the collected tailings, chaff and rethreshed grain is then readmitted to the separating and cleaning units of the combine. In addition, since the readmitted material is evenly distributed across the grain pan 19, large quantities can be efficiently handled without overloading and rendering ineffective any portion of the separating and cleaning mechanisms of the combine.

In the illustrated embodiment (FIGS. 1 and 2), the tailings or cross conveyor 32 includes an auger 35 having a shaft 36 journaled in spaced bearings 37, 38 in the trough 27 and an extending tube 27a. The auger 35 is driven so as to move the tailings toward the conveyor 34 by a pulley 39 that is keyed to the auger shaft 36 and driven by a belt 40 from the main drive of the combine.

In order to lift the tailings to the rethreshing unit 33, the lifting conveyor 34 is disposed at one side of the combine so as to receive the tailings through an opening 32a from the cross auger 35. The lifting conveyor 34 includes an auger flight 41 journaled in a channel defined by a substantially vertical tube 42. The auger flight 41 is wound on a shaft 43 journaled at its ends by bearings 44, 45.

Pursuant to the invention, the rethreshing unit 33 comprises an annular housing 46 containing a substantially circular rethreshing wall 47 which is coaxially mounted on the upper end of the tube 42 and which receives the elevated tailings. A plurality of blades 48 are secured to and project radially outwardly from the shaft 43 to define a rotor within the rethreshing unit 33, the blades sweep over the wall 47 and perform a threshing function.

To increase the rethreshing efficiency of the unit 33, the rethreshing wall 47 is provided with a roughened or irregular inner surface, illustrated here by the projecting steps or corrugations 50 (see FIG. 6.) The rethreshing wall 47 is also preferably sloped upwardly and outwardly with respect to the tube 42 so as to utilize the centrifugal force imparted to the tailings as they are driven by the blades 48. Thus, as the tailings are forced outwardly by the rotating blades 48, they tend to "climb" the inclined rethreshing wall 47 so that the grain is distributed the full height of the wall 47.

To drive the grain and tailings against and around the rethreshing wall 47, the blades 48 are provided with a wide end portion or paddle 51. The paddles 51 are angled slightly backwardly so that they trail the radial portion of the blade and thus enhance the outward flow of the tailings. To insure better rubbing contact with the grain between the blades 48 and the rethreshing wall 47, the paddles are reinforced at their tip ends by rubbing bars 52 inclined to conform to the slope of the rethreshing wall 47. In the preferred embodiment, the paddles 51 have also been given a "twist" so that the upper portions of the bars 52 slightly lead the lower portions (see FIG. 4). Therefore, while the slope of the rethreshing wall 47 and the centrifugal force acting on the tailings cooperate in such a way that the tailings "climb" the wall, the "twist" of the paddles 51 tends to force them down again. The net result of these competing forces is to provide a swirling-churning action in the rethreshing unit 33 which has been found to be most desirable in shaking the grain loose from its hulls.

For connecting the rethreshing unit 33 to the combine, a lateral passageway 53 is provided leading to an opening 54 in the combine body 11 adjacent the cleaning and separating units. The passageway 53 is defined by a substantially flat floor 55 and a corresponding ceiling joined by a wall 57 extending tangentially from the annular housing 46 and a shorter parallel wall 58. The walls 57, 58 are preferably the integral end portions of the housing 46 and are formed with flanges 59, 60, respectively, having openings through which a plurality of bolts 61 pass to secure the unit 33 to the combine body 11.

The substantially circular wall 47 is interrupted between an inclined edge 47a and a radial edge 47b (see FIG. 4) so as to form a V-shaped notch as seen in FIG. 5 providing access from the interior of the unit 33 to the passageway 53. The inclined edge 47a tends to deflect material not thrown against the wall 47 for rethreshing and carry it through another full revolution within the unit 33.

To insure that the elevated tailings are subjected to the maximum rethreshing action before being pitched through the passageway 53, the delivery of the tailings into the rethreshing unit 33 is controlled by a delivery notch 63 formed in the upper end of the tube 42. The notch 63 is positioned just beyond the passageway 53 in the direction the blades 48 rotate so that the bulk of the tailings spill into the unit 33 substantially circumferentially removed from the passageway 53. In this way, the delivered tailings are driven through at least one nearly complete rethreshing revolution before being projected into the combine.

Radial projection of the tailings due to the inherent centrifugal force and the novel swept-back design of the blades 48 has been mentioned above. To assist the outward flow of the tailings from the delivery notch 63, the rethreshing unit 33 is provided with a floor plate 67 sloping downwardly and outwardly from the tube 42. The blades 48 are formed with a relieved portion 68 which not only provides clearance over the unnotched portion of the tube 42 but, also, allows the tailings to spill freely out of the notch 63 and down the sloping floor plate 67 before they are engaged by the paddles 51.

To retain the tailings in contact with the blades 48, a circular top plate 69 is secured to the top edges of the blades 48 so as to shroud the blades and their rubbing bars 52. A stationary outer cover 70 is also provided having a circumferential lip 71 that overlaps the annular housing 46. The outer cover 70 closes the unit 33 and provides support for the bearing 45 journaling the upper end of the shaft 43.

In order to adjust the running clearance between the rubbing bars 52 and the rethreshing wall 47, the wall 47 is mounted for vertical adjustment within the annular housing 46. The vertical position of the wall 47 is set by adjusting a pair of nuts 73 and 74 on a threaded pin 72 extending downwardly from the floor plate 67 (see FIG. 5). The nuts 73, 74 sandwich an arm 75 secured by a cap screw 76 to the wall 47. By raising and lowering the nuts 73, 74, the wall 47 is set in a desired vertical position.

To lock the wall 47 relative to the housing 46, a plurality of cap screws 77 are passed through slots 78 in the housing 46 into threaded engagement with the wall 47. It will be understood that the bolts 77 are loosened and slide along the slots 78 when the nuts 73, 74 are manipulated to set the wall 47. When the proper running clearance between the bars 52 and the wall 47 is established, the bolts 77 are again tightened to secure the wall in place.

For driving the elevating auger 41 and the rethreshing blades 48, their common shaft 43 is coupled to the cross auger shaft 36 by a gear assembly 79. The gear assembly 79 includes a drive sprocket 80 mounted on the cross conveyor shaft 36 and connected by a drive chain 81 to a driven sprocket 82 securely mounted on one end of a coupling shaft 85 that is journaled in bearings 86, 87 retained in a frame 88. Mounted on the other end of the shaft 85 is a bevel gear 83 positioned to mesh with a second bevel gear 84 carried on the lower end of the common shaft 43. An idler sprocket 89 that is adjustably supported by a slide 90 serves to regulate the running tension of the chain 81.

As a safety feature and also to keep the gear assembly free from refuse and foreign matter, the gear assembly 79 is nested within a protective housing 91 having a cover plate 92 with a projecting lip 93 that fits over and covers the end of the housing 91. This arrangement also provides for maximum accessibility of the gear assembly so that the parts may be conveniently adjusted, replaced or lubricated.

In order to prevent clogging of the elevating auger 34 due to an accumulation of collected tailings received from the cross conveyor 35, the driven sprocket 82 preferably has a smaller diameter than the drive sprocket 80, thereby imparting a more rapid rotation to the elevating auger than the cross conveyor. Thus, the elevating auger is capable of effectively carrying away all of the material collected by the cross auger 35 because of its greater rotational speed. In addition, the increased speed of the common shaft 43, which directly rotates the blades 48, provides for more efficient threshing action in the rethreshing unit 33 and gives substantial impetus to the rethreshed grain and tailings in order to project them through the passageway 53 and into and across the combine.

Under some harvesting conditions it may be desirable to simply return the tailings to the cleaning and separating unit of the combine without utilizing the novel rethreshing action described above. Accordingly, the rethreshing unit 33 can be deactivated by inserting a smooth surfaced, relatively thin annular sleeve member 94 in the chamber to lie against the roughened rethreshing wall 42. To secure the sleeve member 94 in position, a plurality of bolts 95, normally "stored" by being tightened in holes provided in the rethreshing wall 47 (see FIGS. 4, 5), are removal and reinserted through openings in the sleeve which are registered with the holes in which the bolts are stored (see FIG. 7). In this regard, it is also obvious that the running clearance of the blades 48 should be changed by vertically adjusting the rethreshing wall, as previously set forth, to accommodate the sleeve member 94.

I claim as my invention:

1. In a combine having a grain cleaning and separating unit including straw walkers and sieves, the combination comprising, a conveyor mounted below said sieves for collecting and moving to one side of said combine the tailings that sift through the straw walkers and overflow the sieves, a rethreshing chamber located adjacent the cleaning and separating unit of the combine, a passageway connecting said chamber and said combine, an elevator arranged to lift said collected tailings to said rethreshing chamber, said chamber having a roughened inner wall sloping downwardly and inwardly toward said elevator, a plurality of rotatable blades disposed in said chamber, said blades being reinforced at their tip ends with rubbing bars inclined to conform to the slope of said walls, means for driving said blades to engage said tailings in rubbing contact with said roughened wall and impart substantial impetus to said tailings so as to thresh and project the tailings through said passageway and across the cleaning and separating unit of the combine.

2. The combination defined in claim 1 in which the roughened inner wall of the rethreshing chamber is vertically movable within said chamber, and including means for vertically adjusting said roughened inner wall for regulating the running clearance of the rotatable blades so as to accommodate different size grain.

3. The combination defined in claim 1 in which the rethreshing chamber includes a smooth sleeve removably positioned adjacent said chamber inner wall for reducing the rubbing contact between the tailings and said chamber inner wall prior to the tailings being projected into said grain separating unit of the combine.

4. In a combine having a grain cleaning and separating unit including straw walkers and sieves, the combination comprising, a conveyor mounted below said sieves for collecting and moving to one side of said combine the tailings that sift through the straw walkers and overflow the sieves, a rethreshing chamber located adjacent the cleaning and separating unit of the combine, a passageway connecting said chamber and said combine, a tube extending from said conveyor to said rethreshing chamber, an auger journalled in said tube to a point below the top of said tube, said tube having a delivery notch at one side of said top, a plurality of rotatable blades disposed in said chamber, means for driving said auger so as to elevate the collected tailings through said tube and out said notch into the path of said blades, said blades being rotated by said auger so that the blades drive said tailings in rubbing contact with said chamber and impart substantial impetus to said tailings to project them through said passageway and across the cleaning and separating unit of the combine, and said notch being disposed adjacent said passageway in the direction of blade movement so that the notch is substantially circumferentially removed from said passageway.

5. In a combine having a grain cleaning and separating unit including straw walkers and sieves, the combination comprising, a conveyor mounted below said sieves for collecting and moving to one side of said combine the tailings that sift through the straw walkers and overflow the sieves, a rethreshing chamber located adjacent the cleaning and separating unit of the combine, a passageway connecting said chamber and said combine, a tube extending from said conveyor to said rethreshing chamber, an auger journalled in said tube to a point below the top of said tube for elevating said tailings, said chamber having a floor sloping downwardly and outwardly from said tube so that said elevated tailings spill outwardly in said chamber, and a plurality of rotatably driven blades disposed in said chamber for driving said elevated tailings in rubbing contact with said chamber, said blades imparting substantial impetus to said tailings to project them through said passageway and across the cleaning and separating unit of the combine.

References Cited in the file of this patent

UNITED STATES PATENTS

| | | |
|---|---|---|
| 551,500 | Landis | Dec. 17, 1895 |
| 616,899 | Chalfant | Jan. 3, 1899 |
| 680,097 | White | Aug. 6, 1901 |
| 1,406,394 | Junkin | Feb. 14, 1922 |
| 2,309,736 | Makin | Feb. 2, 1943 |
| 2,905,182 | Wise | Sept. 22, 1959 |

FOREIGN PATENTS

| | | |
|---|---|---|
| 642,684 | France | Sept. 1, 1928 |